United States Patent [19]

Kalmanash

[11] Patent Number: 4,476,485
[45] Date of Patent: Oct. 9, 1984

[54] CONSTANT CURRENT BIAS COLOR SWITCH FOR A BEAM PENETRATION CRT

[75] Inventor: Michael H. Kalmanash, Fairfield, Conn.

[73] Assignee: United Technologies Corporation, Hartford, Conn.

[21] Appl. No.: 259,394

[22] Filed: May 1, 1981

[51] Int. Cl.³ .................. H04N 9/27; H01J 25/80
[52] U.S. Cl. ...................................... 358/73; 315/375
[58] Field of Search .................. 358/72, 73; 315/10, 315/31 R, 379, 382, 375, 376

[56] References Cited

U.S. PATENT DOCUMENTS

| | | | |
|---|---|---|---|
| 3,339,016 | 8/1967 | Merryman | 358/72 |
| 3,492,416 | 1/1970 | Weber | 375/37 |
| 3,619,647 | 11/1971 | Barkow | 358/73 |
| 3,697,880 | 10/1972 | Melchior | 358/72 |
| 3,863,097 | 1/1975 | Labudda | 315/375 |
| 3,887,838 | 6/1975 | Thurston | 315/376 |
| 4,092,566 | 5/1978 | Chambers | 315/375 |
| 4,104,564 | 8/1978 | Cohen | 358/73 |
| 4,151,444 | 4/1979 | Jenness | 358/73 |
| 4,203,055 | 5/1980 | Chambers | 358/73 |
| 4,281,272 | 7/1981 | Spilsbury | 358/73 |

Primary Examiner—Tommy P. Chin
Attorney, Agent, or Firm—Richard P. Lange

[57] ABSTRACT

A high voltage color switch for a beam penetration CRT includes a constant current driver which provides a bias current to the high voltage transformer in the first color write period when the baseline color is being displayed. One or more secondary colors can be displayed during a second color write period during which a switch connects the transformer to a conventional voltage driver that provides the needed voltage swing. At the end of a secondary color write period the constant current driver is again connected to reset the flux level in the transformer to one end of its dynamic range. During a core reset interval only a small voltage offset appears on the anode of the CRT so that color information written in the baseline color appears without any perceivable change to a viewer. At the end of the core reset period the constant current source continues to supply a constant bias current to the primary winding of the transformer to maintain the flux level at one end of its dynamic range.

7 Claims, 3 Drawing Figures

CONSTANT CURRENT COLOR SWITCH

MAGNETIZATION CURVE

CONSTANT CURRENT BIAS COLOR SWITCH FOR A BEAM PENETRATION CRT

CROSS REFERENCE TO RELATED APPLICATIONS

The subject matter of this patent application is related to that disclosed in U.S. pat. application Ser. No. 259,342 filed May 1, 1981 by M. H. Kalmanash for RANDOM COLOR SWITCH FOR BEAM PENETRATION CRT now U.S. Pat. No. 4,356,435, issued Oct. 26, 1982; to U.S. patent application Ser. No. 259,343 filed May 1, 1981 by M. H. Kalmanash for DUAL MODE COLOR SWITCH FOR BEAM PENETRATION CRT now U.S. Pat. No. 4,337,420, issued June 29, 1982; to U.S. patent application Ser. No. 259,344 filed May 1, 1981 for IMPROVED SEQUENTIAL COLOR SWITCH FOR BEAM PENETRATION CRT now U.S. Pat. No. 4,337,421, issued June 29, 1982; to U.S. patent application Ser. No. 259,381 filed May 1, 1981 by M. H. Kalmanash et al for DIFFERENTIAL RANDOM COLOR SWITCH FOR BEAM PENETRATION CRT; to U.S. patent application Ser. No. 259,383 filed May 1, 1981 by M. H. Kalmanash for STROKE DURING RETRACE COLOR SWITCH; and to U.S. patent application Ser. No. 284,831 filed July 20, 1981 by M. H. Kalmanash for MODULAR HIGH SPEED COLOR SWITCH, now abandoned, all of which are assigned to the same assignee as the present case.

DESCRIPTION 1. Technical Field

This invention relates to a high voltage color switch for a beam penetration CRT, and more particularly, to a color switch which uses a constant current source which biases the primary winding of the high voltage transformer during the primary color write period. 2. Background Art A beam penetration-type color CRT (cathode-ray tube) is generally known and is a display device having a faceplate on which an image or alphanumeric characters can be written. One or more phosphor layers on the inner surface of the faceplate can be selected to emit almost any desired wavelength of visible light. If two layers of phosphor are deposited on the faceplate, it is possible to display more than two distinct colors by changing the depth of penetration of the electron beam into the phosphor layers. Because the electron beam emitted by the cathode in the neck of the CRT strikes the phosphor layers at a velocity influenced primarily by the voltage level on the accelerating anode, a change in the voltage level applied to the accelerating anode will correspondingly change the proportion of light emitted by the two phosphor layers. In other words, in a penetration CRT with two layers of different light emitting phosphor up to about four colors can be displayed to a viewer by changing the DC voltage level applied to the accelerating anode positioned near the front of the CRT.

A significant limitation encountered in the use of penetration-type CRT's is related to the length of the reset period between write periods. Because the DC voltage level on the accelerating anode must be changed during the reset period, the length of the reset period is primarily defined by the electrical capacitance associated with the anode. The anode has a relatively large physical size and, as such, inherently has a large capacitance resulting in a significant amount of electrical charge being stored thereon during a write period. Of course, any additional capacitors, particularly large capacitors which are often used in high voltage power supplies, also increase the capacitance in the high voltage circuit and add to the reset period. Because this electrical charge is increased, or decreased, to change the voltage level on the anode, the reset period separating two write periods is related to the charge/discharge rate inherently associated with the total capacitance seen by the high voltage power supply.

Another limitation found in prior art color switches used with beam penetration CRT's is related to the sequencing of the colors to be displayed on the CRT faceplate. Although it is possible to display between three or four distinguishable colors on a two-layer penetration CRT, some high voltage color switches must operate in a particular sequence. In other words, the high voltage color switch provides one preselected voltage level to the anode in successive write periods, that is, the anode voltage is changed from 10 KV to 14 KV, from 14 KV to 18 KV and finally from 18 KV back to 10 KV. During each of these sequential write periods, images or alphanumerics written by the electron beam are displayed only in that color corresponding to the voltage level impressed on the anode. If images or alphanumerics are to be displayed in one color, such as red, during a particular write period, then at the completion of that write period no additional red information can be displayed until the high voltage color switch sequences through its preselected voltage levels to the next write period at which red information can be displayed.

Of particular interest is U.S. Pat. No. 3,906,333 issued Sept. 16, 1975 to M. Kalmanash for LOW COST SWITCHING HIGH VOLTAGE SUPPLY, assigned to the same assignee as the present case, which describes a switching high voltage power supply for use with a beam penetration-type cathode-ray tube. This power supply has the secondary of a high voltage step-up transformer in series with the accelerating anode of the cathode-ray tube. The primary of the transformer is connected to ground through a capacitor for developing a DC voltage level. This voltage across the capacitor is fed to the regulating input of the baseline DC high voltage power supply. The color switching power supply of the present invention is an improvement over that described in this patent.

Another patent of interest is U.S. Pat. No. 4,092,556 issued May 30, 1978 to D. Chambers et al for SWITCHED HIGH VOLTAGE POWER SUPPLY SYSTEM. This patent describes a high voltage power supply for the rapid switching of high voltage applied to the anode of a beam penetration color cathode-ray tube. The energy for making the rapid transition between voltage levels is stored in two inductors, one for upward transitions and the other for downward transitions. When it is desired to change the voltage applied to the cathode-ray tube, the appropriate one of the storage inductors is coupled through a control switch to the anode causing the voltage applied to the anode to change at a rapid rate. The voltage rises until the desired voltage level corresponding to a desired upward color is reached at which time the switch is turned off and the storage inductor recharged. A tracking high voltage supply maintains the anode at the predetermined voltage level once that level has been reached.

DISCLOSURE OF THE INVENTION

It is an object of the present invention to provide a color switch for a beam penetration CRT which is capable of random operation in a write period from a nonbaseline color without the need for a core reset period during which the flux level in the high voltage transformer is reset to prevent saturation.

A particular feature of the present invention is to provide a color switch for a beam penetration CRT in which color write periods in a secondary color can be randomly selected.

Yet another feature of the present invention is to provide a color switch for a beam penetration CRT in which a constant current driver provides a bias current in the primary winding of a high voltage transformer during the write period for the primary color thereby eliminating the need for a core reset period at the end of a secondary color write period to reset the transformer flux level.

According to the present invention a constant current color switch for a beam penetration CRT includes a high voltage power supply having an out-put voltage which is supplied to the anode of a CRT through the secondary of a high voltage transformer. The voltage level of the high voltage power supply is set to the voltage level required to generate the color in which information is displayed most of the time or the primary color, e.g., green. In the preferred embodiment, this corresponds to an anode voltage of 18 KV. This green is typically chosen as the primary color since it has the best brightness and resolution since it is written at the highest available anode voltage. A high voltage transformer has its secondary winding in the high voltage circuit to the anode so that the voltage level presented to the anode can be changed throughout a range, e.g., 18 KV to 10 KV by changing the transformer voltage. One side of the primary winding is connected to a low voltage power supply, e.g., 5 volts. A constant current driver as well is powered by this low voltage power supply. The other side of the primary winding is connected to a switch so that a signal from either the constant current driver or a color bit processor can be presented to the primary winding. When the CRT is to display the primary color, which is most of the time, the switch connects the current driver to the primary winding of the transformer so that a constant bias current is provided to the primary winding of the transformer which sets a magnetic field in the transformer core just short of core saturation. To generate a write period in a secondary color, the switch is transitioned connecting the voltage driver to the primary winding of the transformer. This allows a sufficient voltage to be impressed on the primary winding to change the voltage level on the secondary side which combines with the high voltage power supply output to set the appropriate level for the secondary color write period. The secondary colors all involve a unidirectional drive on the transformer, with respect to the primary color. Thus, the constant current drive which sets the magnetic field and thus the core flux density to one extreme during the primary color interval permits utilization of the full dynamic range of flux during random operation, which minimizes the size of the transformer. It also resets the transformer core during the primary color interval.

The foregoing and other objects, features and advantages of the present invention will become more apparent from the following description of a preferred embodiment and accompanying drawing.

BEST MODE FOR CARRYING OUT THE INVENTION

Figure 1:
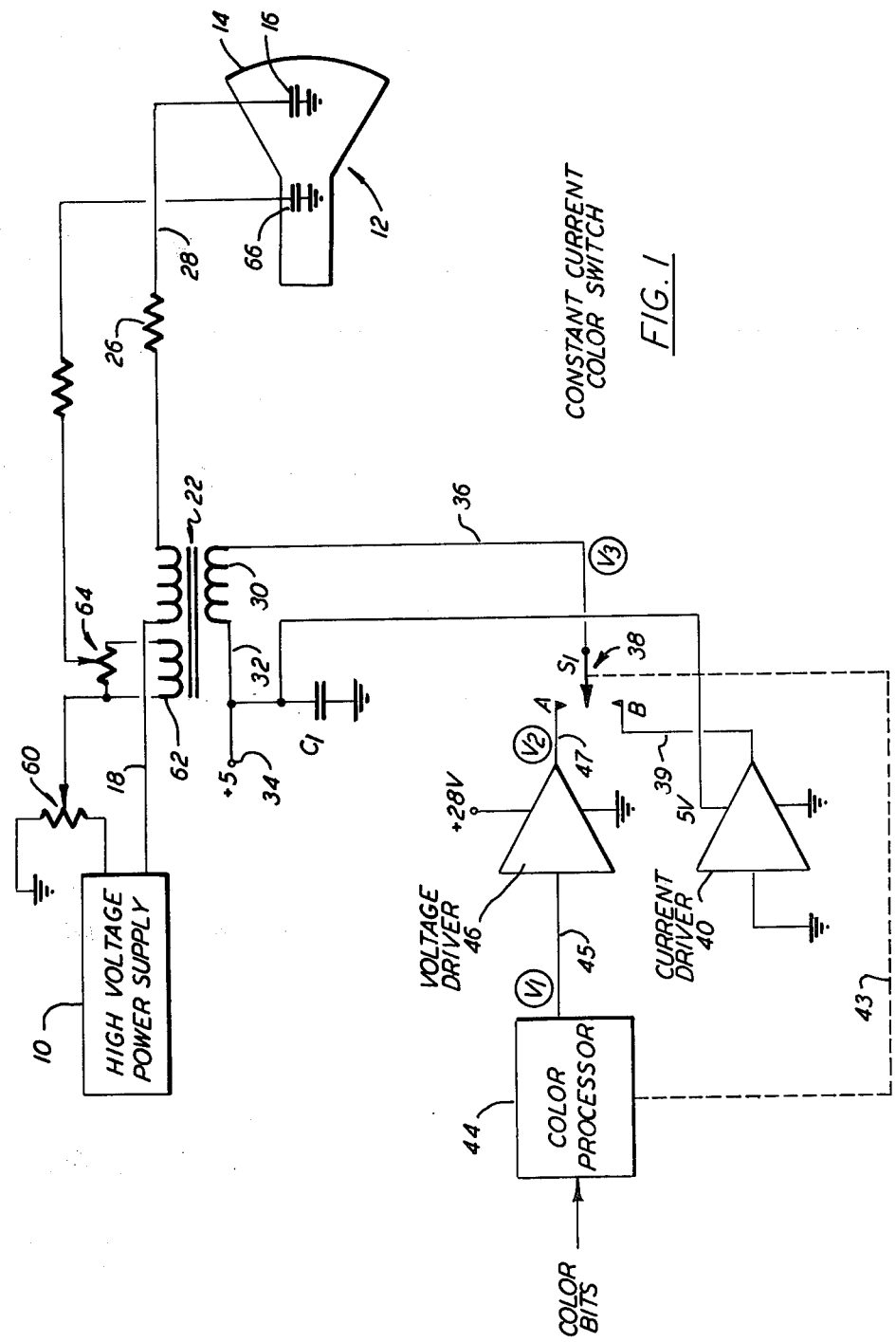
FIG. 1 is a schematic block diagram depicting one embodiment of the constant current color switch for a beam penetration CRT according to the present invention.

Referring first to FIG. 1, there is seen one embodiment of a constant current color switch for a beam penetration CRT according to the present invention. In preferred form, a high voltage power supply 10 of a known type is provided and its DC output level is selected to provide a predetermined baseline color (described in greater detail hereinafter) in a beam penetration CRT (cathode-ray tube) 12. The CRT 12 includes a faceplate 14 on which images are written by a beam of electrons. The inner surface of the faceplate 14 typically has at least two layers of phosphor deposited thereon, each layer emitting a distinct wavelength, or color, of light in response to being excited by the electron beam. For the purpose of appreciating the present invention, it will be assumed that there is one layer of green phosphor (closest to the faceplate) and one layer of red phosphor located on the inner surface of the faceplate 14. Of course, more than two layers of phosphor could be deposited on the faceplate 14. The beam of electrons is emitted by a cathode (not shown) located near the end of the neck portion of the CRT 12; the individual electrons are accelerated toward the faceplate 14 under the influence of a high voltage applied to the anode 16. As is known, the anode 16 is formed from a material of high conductivity and is positioned circumferentially around the front portion of the tube to influence the beam of electrons. Because of its large size, the anode 16 has a relatively high capacitance and, for the purposes of simplicity, is illustrated in the preferred embodiment of FIG. 1 as a capacitor.

In accordance with the present invention, the output of the high voltage power supply is presented along a line 18 to one end of a secondary winding 20 of a transformer 22. The other end of the secondary winding 20 is connected by a line 24 to a damping resistor 26, the other end of which is connected by a line 28 to the anode 16. As will be appreciated, the just described circuit is essentially a high voltage circuit operating in the range of, for example, 10 KV to 18 KV to provide voltage levels suitable for accelerating the beam of electrons toward the faceplate 14.

In the present invention, that color in which information is displayed on the faceplate most of the time is known as the "baseline color" and is obtained by impressing the highest voltage level, i.e., 18 KV, on the anode 16 from the high voltage power supply 10. The color which corresponds to this highest voltage level, green, also has the greatest contrast and resolution. A secondary color is a nonbaseline color displayed on the faceplate 14 for write periods of a relatively short duration, e.g., a total of 2 milliseconds out of a total period of 16 milliseconds (display refresh period), and typically information written during these secondary color write period are to contrast with that written in the baseline color. For example, information may be written in a red color which requires more immediate attention by the viewer than information written in the baseline color, green. In this embodiment, the secondary color write period may be a single interval or may be smaller intervals randomly placed in the display refresh period. The secondary colors are obtained during a secondary color write period by changing the voltage level impressed on the anode 16 within the selected voltage range. For example, in the present embodiment secondary color write periods can be obtained by impressing from 10 KV to 18 KV on the anode which is accomplished by subtracting a voltage of 8 KV or less from the high voltage power supply via the transformer 22.

The transformer 22 also has a primary winding and the turns ratio is selected to provide the needed voltage swing from the baseline color in the known manner. For example, if a 1 to 320 turns ratio were employed in the transformer 22, a 25-volt change across the primary winding 30 would cause an 8 KV change across the secondary winding 20. Because this voltage swing is tied to a baseline voltage level of approximately 18 KV, the resulting swing on the line 24 would be within the range of 18 KV to 10 KV. Still referring to FIG. 1, one end of the primary winding 30 is connected by a line 32 to a terminal 34, to which a low voltage portion of a low voltage power supply (not shown) is connected. This essentially supplies the voltage potential for the biasing current when the baseline color is being displayed on the CRT. The other end of the primary winding 30 is connected by a lead 36 to a switch 38. The switch 38 has two positions, one of which is for the baseline color mode (position B) and the other of which is for the secondary color mode (position A). A current driver 40 is provided and functions as a constant current source with the switch 38 in the "B" position to keep a constant current on the line 39. In the baseline color mode the current driver 40 is connected to the transformer 22 so that the constant bias current is continually passed through the primary winding 30 in one direction. In the secondary color mode input color information is initially received by a color bit processor 44. The color processor 44 generates pulse waveforms at its output on a line 45 which is amplified by a voltage driver 46. The switch 38, in its "A" position, is connected via line 47 to the output of the voltage driver 46 so that the amplified waveform corresponding to the selected secondary color can be presented to the primary winding 30 to change the color displayed by the CRT 12.

Figure 3:
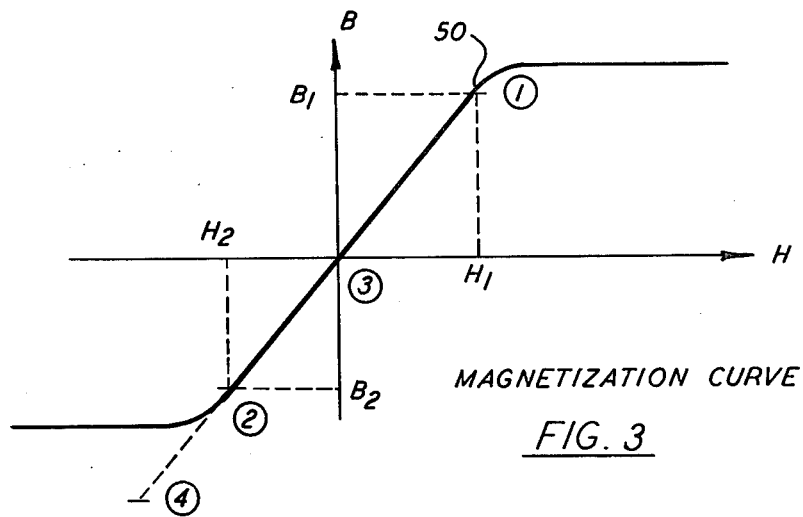
FIG. 3 is a drawing depicting the magnetization curve of the high voltage transformer in FIG. 1.

Referring next to FIG. 3, there is seen a typical magnetization curve for the transformer 22. As mentioned herebefore, one feature of the constant current color switch of the present invention involves maintaining a constant current in the primary winding 30 when the baseline color is being displayed on the CRT 12. This current essentially drives the flux level to its maximum reset position to obtain as much dynamic range in the secondary color write periods as possible. As is well known, if the flux level is driven beyond $H_1$ (to the right of $H_1$) or beyond $H_2$ (to the left of $H_2$) the transformer is driven into saturation and the secondary output voltage sags. The flux density, B, is a function of the transformer core material and size as well as the number of turns in the windings and is related to the amplitude and duration of a voltage pulse applied to the primary winding 30. In other words, to increase the flux density capability of the transformer 22 it would be necessary to increase the physical size of the transformer or the number of turns. It is highly desirable to use the entire dynamic range in order to minimize the transformer size, since increasing the number of turns slows the dynamic response of the transformer, i.e., increases the transition time to secondary colors. In the present invention, the constant current applied to the primary winding 30 drives the flux level to just below its saturation point, i.e., 50.

A particular feature of the present invention is that it also provides dynamic tracking color focus voltage for the CRT 12. In preferred form this includes a first potentiometer 60 which is coupled to the output of the high voltage power supply 10. This is a separate output which has a lower DC level than the output used to supply the anode voltage. The first potentiometer 60 is connected through a winding 62 which is an additional winding on the transformer 22 to a second potentiometer 64. The potentiometer 64 is used to provide dynamic adjustment to the voltage applied to the focus electrode 66 which is located near the front portion of the electron gun (not shown) of CRT 12. Typically, the focus voltage level applied to the focus electrode is a fixed percentage level of the voltage applied to the anode 16. A particular feature of the present invention is that this focus system requires a minimum of additional parts, only a couple of potentiometers and the additional winding on the transformer 22. The first potentiometer 60 adjusts the DC baseline voltage level while the second potentiometer 64 adjusts the dynamic output to the level applied to the focus electrode 66.

The operation of the constant current color switch according to the present invention will now be described with reference to FIG. 3 together with the aforementioned figures. Prior to time $t_0$, the switch 38 is in the "B" position and the high voltage power supply 10 provides an 18 KV voltage level to the anode 16 of the CRT 12 so that information is written on the CRT 12 in the primary or baseline color, i.e., green. At time $t_0$, the color bit processor 44, acting in response to incoming color information, is to transition the voltage level on the anode 16 to a suitable level to display a secondary color, i.e., red, so that information can be written on the faceplate 14 during this secondary color write period in a contrasting color. A control pulse presented by the color processor 44 along the line 43 transitions the switch 38 from its "B" position to its "A" position. At the same time, a pulse is provided along line 45 to the input of the driver 46. This pulse is amplified by the driver 46 to form an output waveform which creates an 8 KV voltage swing in the transformer 22 that is of opposite polarity to that of the high voltage power supply 10. The voltage level on the anode 16 is thus driven to the 10 KV level during this period $t_0$ to $t_1$ so that information written on the face-plate 14 during this interval is displayed in the secondary color, red.

Figure 2:
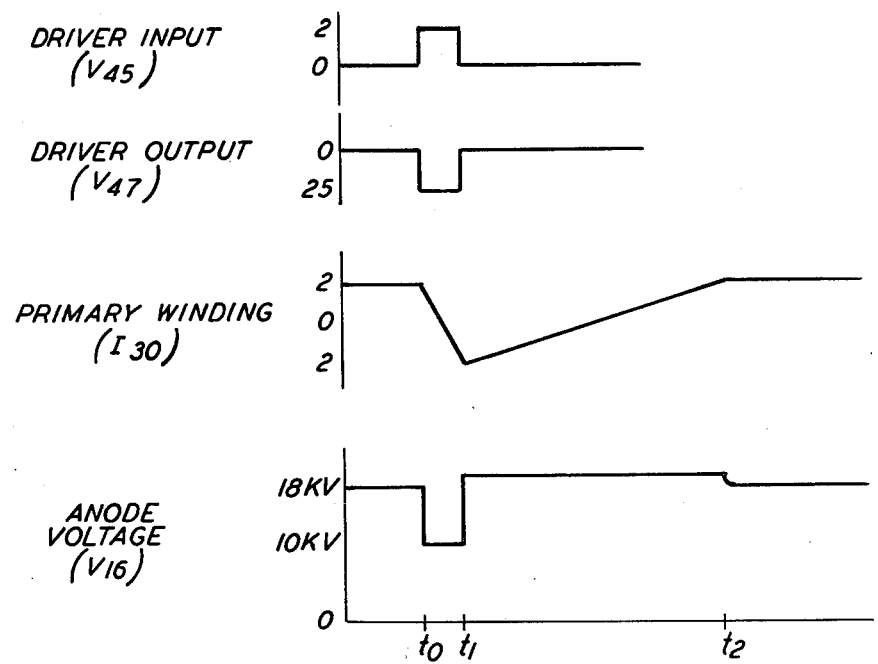
FIG. 2 is a drawing depicting waveforms at various points in the embodiment of FIG. 1.

At the end of the secondary color write interval, time $t_1$, the switch 38 is transitioned back to its "A" position and the color switch of the present invention is now ready to display information in the baseline color, green. However, it will be noted that the magnetizing current in the transformer 22 was driven in the direction toward the other end of its dynamic range during the secondary color write period. The constant current driver 40 now restores the magnetizing current back toward the constant level prior to time $t_0$, or the end of its dynamic range. Because this magnetic reset current is driven by a lower voltage source, e.g., 5 volts versus 28 volts, during this reset period, time $t_1$ to time $t_2$ there is a small change in the associated voltage level on the anode 16. As seen in FIG. 2, this small increase in the voltage level applied to the anode 16 is about 1 KV, compared to the baseline voltage level on the anode 16 during the primary color period of about 18 KV so that it essentially is not perceived by a viewer. Finally, by time $t_2$ the magnetizing current in the primary winding has been fully restored to one end of its dynamic range and the current driver 40 then supplies a constant bias current to the primary winding 30. As would be expected, because there is no longer any change in current through the primary winding 30, there is no voltage change across the secondary winding 20 and the voltage impressed on the anode 16 returns to that of the output of the high voltage power supply 10, or 18 KV.

Although this invention has been shown and described with respect to a preferred embodiment, it will be understood by those skilled in this art that various changes in form and detail thereof may be made without departing from the spirit and scope of the claimed invention.

I claim:

1. A high voltage color switch for a beam penetration cathode-ray tube for displaying a baseline color in a first color write period and at least one secondary color in a first color write period and at least one secondary color in a second color write period, comprising:
   high voltage power supply means connectable to said cathode-ray tube to provide a baseline color when applied to said cathode-ray tube during said first color write period;
   transformer means connectable between the output of said high voltage power supply and said beam penetration cathode-ray tube;
   current means for providing a bias current to said transformer during said first color write period;
   voltage means for providing a voltage waveform with a suitable swing to said transformer for changing the voltage level to said beam penetration cathode-ray tube to one or more secondary colors during said second color write period;
   switch means for alternatively connecting said voltage means and said current means to said transformer during said second color write period and said first color write period, respectively; and
   whereby said current means provides a bias current to said transformer during said first color write period to drive the flux level in the core of said transformer to one end of its dynamic range, and said voltage means provides a suitable waveform to said transformer during said second color write period to switch the color displayed by said beam penetration cathode-ray tube to said at least one secondary color.

2. A high voltage color switch according to claim 1, further including a low voltage power supply having a first reference level and a second reference level, said second reference level being lower than said first reference level, and wherein said low voltage power supply is connected to said driver means to supply a voltage of said first reference level thereto, and wherein said low voltage power supply is also connected to said current means to supply a voltage of said second reference level thereto.

3. A high voltage color switch according to claim 2, wherein said transformer means includes a primary winding, one end of which is connected to said switch means, and wherein the other end of said primary winding is connected to said low voltage power supply to receive said second reference level.

4. A high voltage color switch according to claim 1, wherein said cathode-ray tube includes a focus electrode to which a DC high voltage is applied to focus the electron beam, and further including a means connected to said focus electrode for providing a focus voltage that tracks the high voltage DC level applied to said cathode-ray tube.

5. A high voltage color switch according to claim 4, wherein said means for providing a focus voltage includes a focus voltage winding on said transformer means connected between said high voltage power supply and said cathode-ray tube.

6. A high voltage color switch according to claim 5, wherein said means for providing a focus voltage includes a first potentiometer connected between said high voltage power supply and said focus winding of said transformer means for proportionally adjusting the voltage level from said high voltage power supply.

7. A high voltage color switch according to claim 6, wherein said means for adjusting the focus voltage further include a second potentiometer coupled across the focus winding of said transformer means to proportionally adjust the voltage swing applied to said focus electrode.

* * * * *

UNITED STATES PATENT AND TRADEMARK OFFICE
CERTIFICATE OF CORRECTION

PATENT NO. : 4,476,485

DATED : October 9, 1984

INVENTOR(S) : Michael H. Kalmanash

It is certified that error appears in the above-identified patent and that said Letters Patent is hereby corrected as shown below:

Column 7, line 26:  after "color in a" delete "first color write period and at least one secondary color in a"

Additionally, please note, Column 1, line 31 "1. Technical Field" and Column 1, line 37 "2. Background Art" are in an improper format.

Signed and Sealed this

Twenty-fourth Day of December 1985

[SEAL]

Attest:

DONALD J. QUIGG

Attesting Officer

Commissioner of Patents and Trademarks